May 23, 1967  C. T. BROWN  3,320,631
APPARATUS FOR REMOVING SCALLOPS FROM THEIR SHELLS
Filed June 24, 1965  4 Sheets-Sheet 1
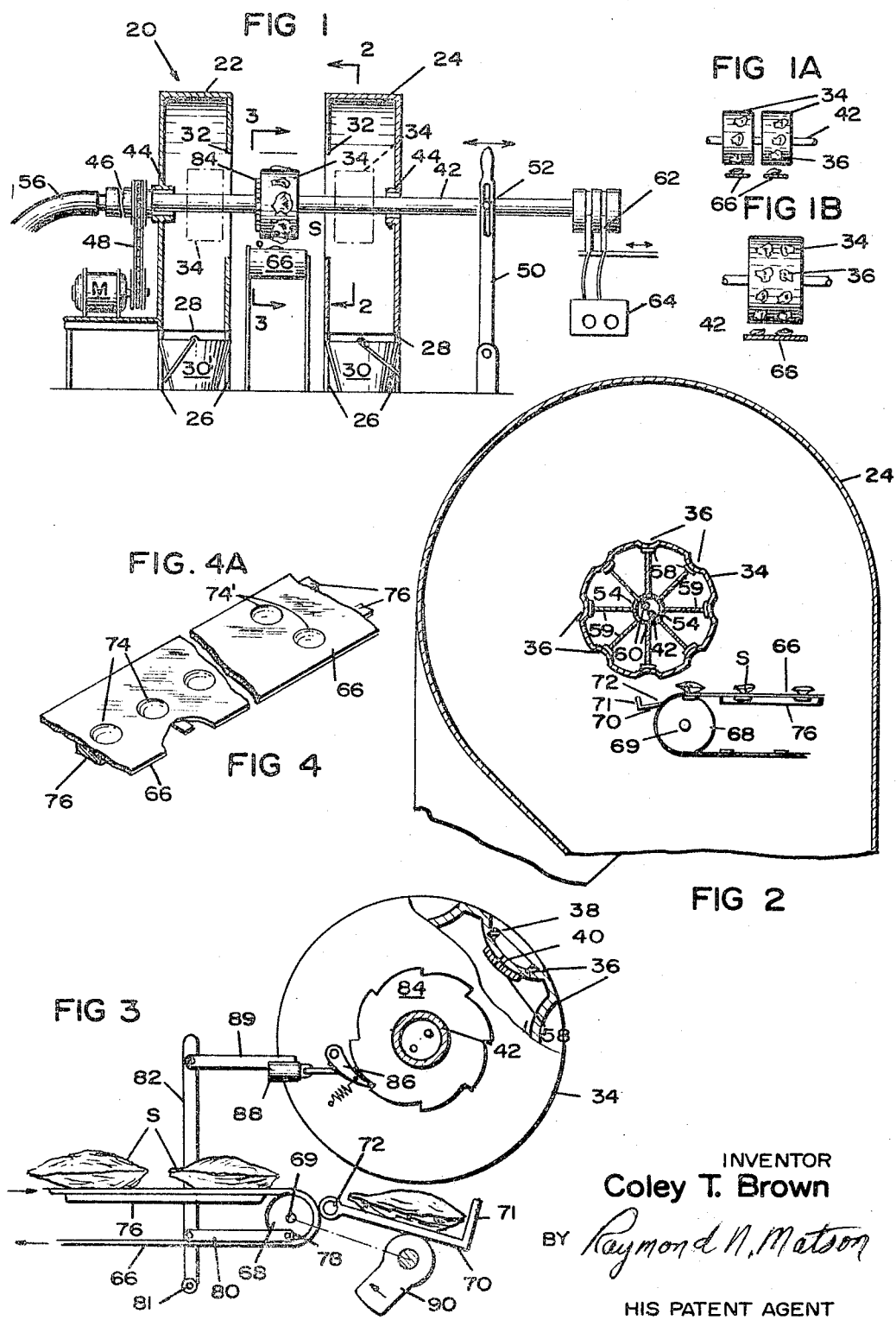
INVENTOR
Coley T. Brown
BY Raymond N. Matson
HIS PATENT AGENT

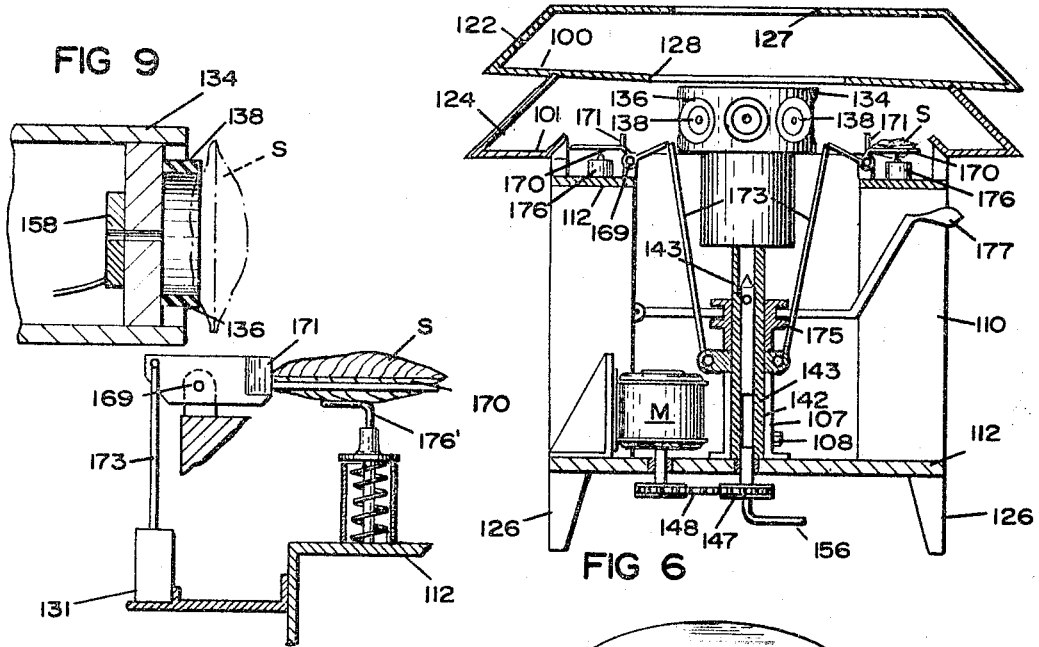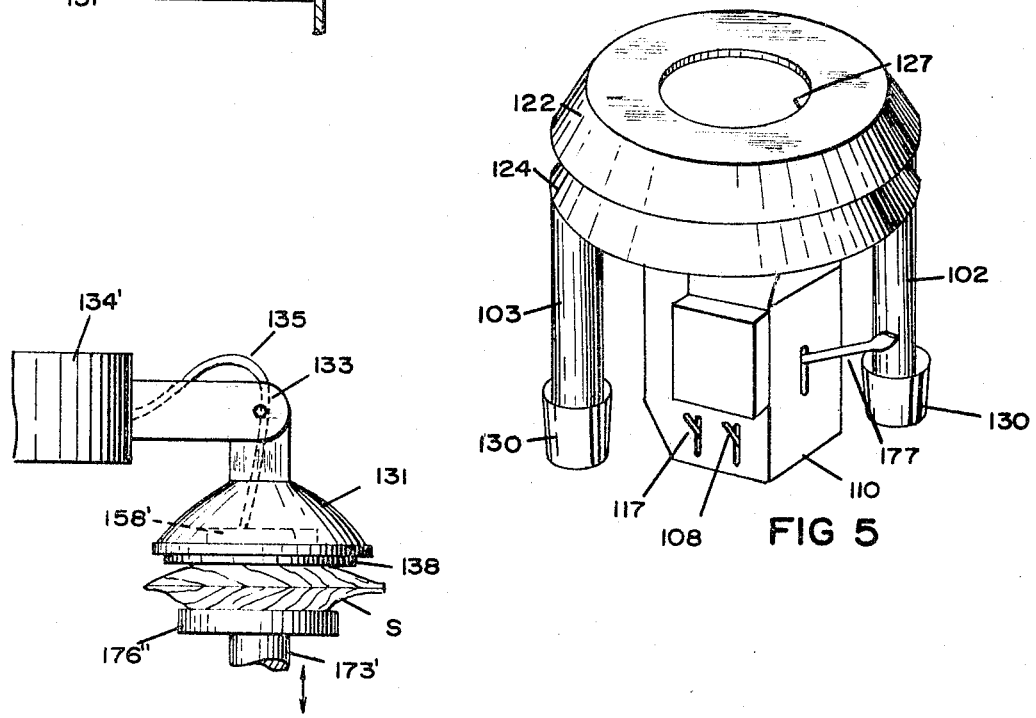

May 23, 1967  C. T. BROWN  3,320,631
APPARATUS FOR REMOVING SCALLOPS FROM THEIR SHELLS
Filed June 24, 1965  4 Sheets-Sheet 3
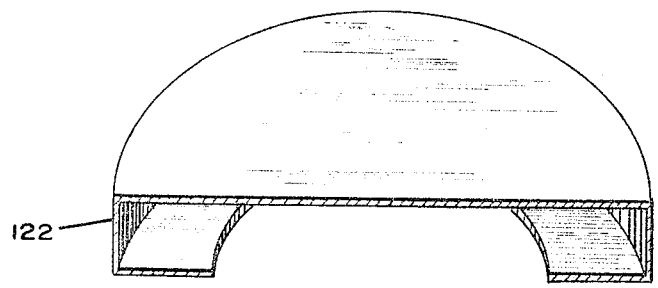
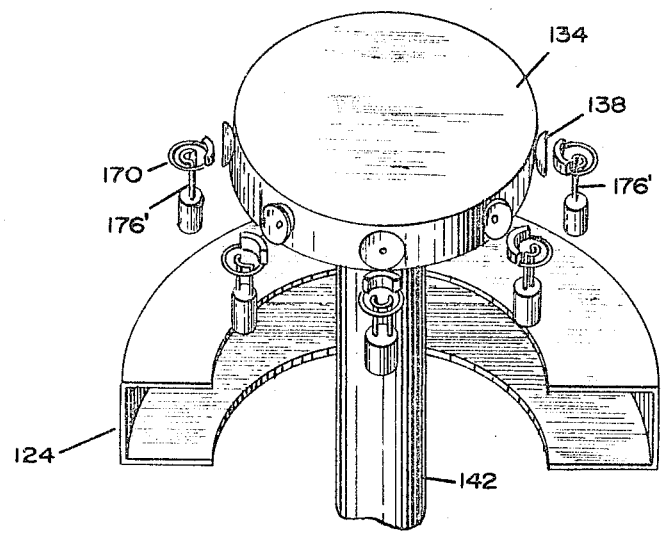
FIG 7
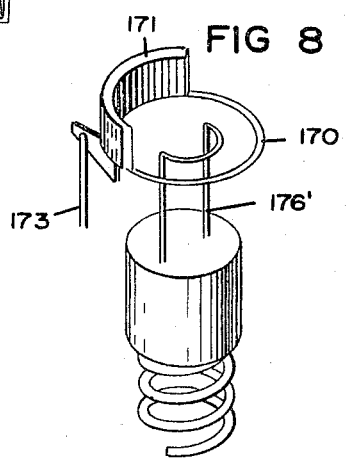
FIG 8
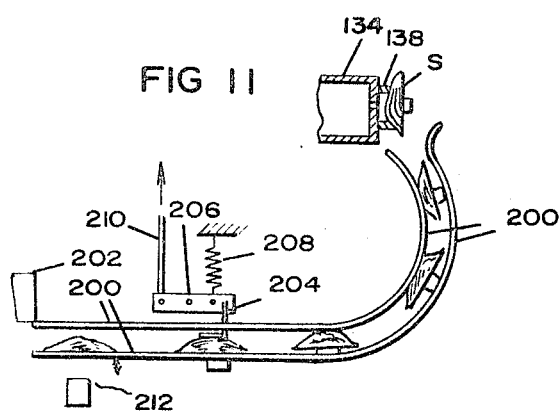
FIG 11
INVENTOR
Coley T. Brown
BY *Raymond N. Matson*
HIS PATENT AGENT May 23, 1967 C. T. BROWN 3,320,631
APPARATUS FOR REMOVING SCALLOPS FROM THEIR SHELLS
Filed June 24, 1965 4 Sheets-Sheet 4

INVENTOR
Coley T. Brown
BY *Raymond N. Matson*
HIS PATENT AGENT

United States Patent Office 3,320,631
Patented May 23, 1967

3,320,631
APPARATUS FOR REMOVING SCALLOPS FROM
THEIR SHELLS
Coley T. Brown, 62 N. Woodland St.,
Englewood, N.J. 07631
Filed June 24, 1965, Ser. No. 466,648
16 Claims. (Cl. 17—2)

This invention relates generally to apparatus for removing the meat of scallops from their shells and more particularly to an improved apparatus to which live scallops are fed, and which separate the scallop meat from the inedible material including the shells at a much faster rate than manually so as to afford material savings in time and labor costs.

As is generally known, the harvest of scallops from natural shellfish beds along the Atlantic coast and its bays and elsewhere has been on the increase for several years due to conservation programs so that current harvests are at an all time high. Harvesting equipment, however, has not kept pace with the increased harvests and modern methods and, insofar as is known, the meat of scallops is still manually separated from their shells so as to needlessly prolong the labor involved and time required to deliver the scallop meat to the market.

Accordingly, the main object of the present invention is to provide an improved apparatus for expeditiously and economically separating the meat of scallops from their shells without injury to the meat and without requiring a skilled operator.

An important object of the present invention is to provide an improved apparatus for readily separating the meat of live scallops from their shells whether they be the small bay scallops, the larger sea scallops which have coarser grained meat, or calico scallops.

Another important object of the invention is to provide novel means for separating the meat or muscle of a scallop from one of its shells after one shell and inedible materials have been removed therefrom.

A further important object of the present invention is to provide an improved apparatus for rapidly and economically removing the meat or muscles of scallops of any variety from their shells which provides a novel rotatable scallop support and heater, and novel scallop feeding and novel discharge means which are selectively movable relative to the support to effect the desired scallop-shell separation, or vice versa.

Other objects and advantages of the invention will become apparent during the course of the following description.

In the drawings I have shown several embodiments of the invention. In these showings:

FIGURE 1 is a front elevational view of one form of apparatus for separating scallops from their shells, parts being omitted for clarity;

FIGURE 1A is an elevational view showing the use of two scallop holding vacuum heads instead of one as in FIGURE 1;

FIGURE 1B is a similar view showing the use of a single vacuum head having a plurality of rows of scallop seating apertured recesses;

FIGURE 2 is a transverse vertical sectional view thereof taken on the line 2—2 of FIGURE 1, parts being shown in elevation;

FIGURE 3 is a similar view to an enlarged scale, taken on the line 3—3 of FIGURE 1 showing the scallop feeding conveyor;

FIGURE 4 is a fragmentary top perspective view of the endless conveyor of FIGURE 3 for feeding scallops to the rotatable vacuum head;

FIGURE 4A is a similar view of a modified form thereof;

FIGURE 5 is a perspective view of a different embodiment of the invention;

FIGURE 6 is a central vertical sectional view thereof;

FIGURE 7 is a diagrammatic view illustrating a different means for heating one side of the scallop-shell;

FIGURE 8 is a perspective view to an enlarged scale of the heating means of FIGURE 7;

FIGURE 9 is a fragmentary vertical sectional view illustrating different means for moving a scallop to the rotatable vacuum head;

FIGURE 10 is a further modification thereof;

FIGURE 11 is a diagrammatic view of one means for separating a scallop from the second half of its shell.

Figure 12:
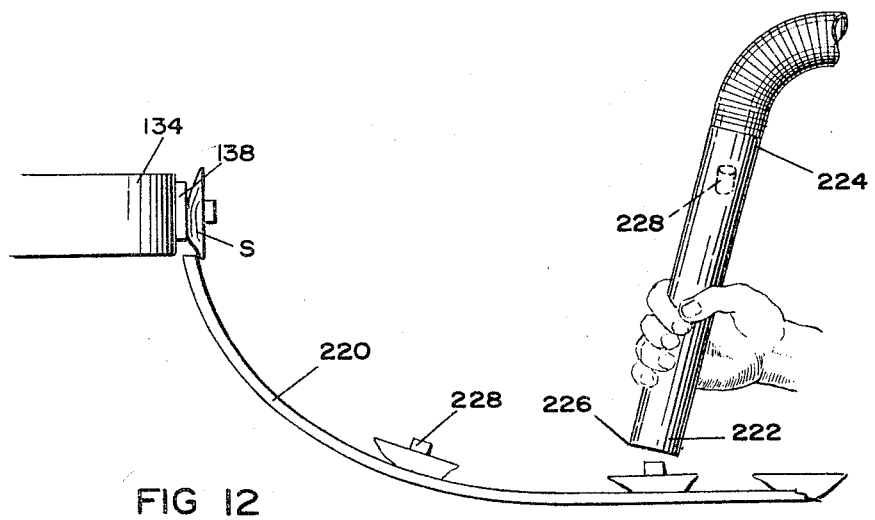
FIGURE 12 is a diagrammatic view of another embodiment of means for separating the meat of a scallop from the second half of its shell.

In its broadest aspects, the invention contemplates an improved apparatus for rapidly and efficiently separating scallops from their shells which employs a rotatable vacuum head having apertured recesses in which one half of the shell of a scallop is seated after the other half has been heated so as to cause the scallop muscle to release the latter, the vacuum head being intermittently operable to hold the shell against the recess by vacuum and then release it for discharge, and which head is rotated to remove the heated shell and inedible material by centrifugal force after which the scallop is separated from the remaining unheated shell.

Referring to FIGURES 1 to 4 of the drawings, numeral 20 designates one form of the apparatus as a whole which includes a pair of spaced hoods 22, 24 which are supported by legs 26 and taper downwardly to and terminate in discharge openings 28 under which buckets 30 or a conveyor (not shown) is placed to separately collect the scallops and the separated shells and inedible materials and fluids present in live scallops. The hoods are otherwise closed except for large openings 32 in their adjacent faces for the passage of one or more vacuum heads 34 into and out of the hoods as will be described.

Each vacuum head 34 is a generally round drum provided throughout its periphery with closely spaced recesses 36 having soft, scallop seating cups 38 of rubber, etc. each of which communicates with the interior of the drum by an aperture 40. The hub of the vacuum head 34 is fixed to and hence rotates with a hollow drive shaft 42 which is suitably journalled for rotation as by bearings 44 in the hoods 22 and 24. Power is provided in the form of a motor M which is drivably connected to an internally splined sleeve 46 rotatably mounted on the hood 22 by a chain 48. The exterior of the drive shaft 42 is splined so as to be driven by the sleeve 46 while permitting the shaft to be moved linearly to the left or right (FIGURE 1) by a pivoted slotted control lever 50 which engages a collar, or the like by its pin 52 on the shaft so as to position the vacuum head 34 within either of the hoods 22 and 24 for a purpose to be described.

A source of vacuum (not shown) of from 6 to 26 inches of mercury is connected to the interior of the drive shaft 42 (and with the vacuum head or the drum 34 and the suction cups 38 by means of shaft apertures 54) by means of a flexible hose 56 and when scallops are positioned on the suction cups 38 by feeding means to be described, they are retained thereon even during rotation of the vacuum head 34 at rotational speeds of from 1200 to 2000 r.p.m. which are employed to effect the separation of the scallop meat from one or both of its shells by centrifugal force with air frictional forces, of course, assisting in such separation.

Each of the apertured, scallop-receiving recesses 36 is provided with electric heating means in the form of a bar 58 which acts to release the hold of the muscle or scallop meat on the shell held by vacuum. Each of the bars 58 is connected by radial conductors 59 to rods 60 centrally positioned in the drive shaft 42 and having electrical connection with slip rings and brushes 62 connected to a source of electrical energy (not shown) with an interposed control panel 64 (shown diagrammatically) for controlling the motor M and the heating bars 58.

Feeding of the scallops to the vacuum head or scallop recesses of the apparatus 20 may be accomplished in several ways as disclosed in the various figures of the drawings and, as shown in FIGURES 1 to 4, is effected by a conveyor belt 66 mounted between the hoods 22, 24 on pulleys 68 driven by a Geneva mechanism (not shown) powered by the motor M. The conveyor belt 66 is intermittently advanced by the Geneva mechanism so that a scallop, arriving at the end of the belt, is deposited on a downwardly inclined feeding tray 70 having a confining upstanding edge 71 and which is pivoted as at 72 to the conveyor supporting mechanism (not shown). The conveyor belt is provided with spaced scallop-receiving recesses 74 in which the scallops S may be manually or otherwise placed. As the scallops approach the end of the conveyor belt 66, they pass over a heating means which may be gas, steam, or a bar 76 which is electrically connected to the control panel 64 (by means not shown) and which heats the lower half of the scallop-shells and releases the hold of the meats (muscle) thereon.

As the conveyor belt 66 is intermittently advanced toward the vacuum head 34 and its scallop-receiving recesses 36, a crank pin 78 spaced from the shaft 69 of the pulley 68 reciprocates a lever 82, about its pivot 81 by means of a connecting pitman 80. A side of the vacuum head 34 is provided with a ratchet 84 which is engaged by a pivoted pawl 86 under the urging of the plunger of a solenoid 88 mounted on the end of an arm 89 pivoted to an upper portion of the lever 82. Thus, intermittent operation or movement of the belt 66 effects intermittent operation in timed relation therewith of the vacuum head 34 so that each scallop arrives at the feeding tray just as a recess 36 arrives thereabove. At this time, a rotating cam 90 which is driven by the pulley shaft 69, as is diagrammatically illustrated, hits the bottom of the tray 70 to lift the scallop into a recess 36 where it is retained by the vacuum. It is to be noted that the shaft 42 is not being driven by the motor M during this scallop feeding process and that thereafter, when the shaft is driven at high speed, the solenoid 88 is energized to hold the pawl 86 out of engagement with the ratchet 84.

FIGURE 1A illustrates the use of two vacuum heads 34 mounted in closely spaced relation on the drive shaft 42 to increase the output of the apparatus. Optionally, as shown in FIGURE 1B, a single vacuum head 34 having a plurality of rows of scallop-receiving recesses 36 may be employed in which case the scallop feeding conveyor belt 66 is also provided with an equivalent number of rows of scallop-receiving recesses 74' as indicated therein in FIGURE 4A.

In operation, the scallops are fed manually or otherwise to the recesses 74 in the conveyor belt 66 which is intermittently driven by the motor M through Geneva mechanism (not shown). The vacuum and the electric heaters 76 are turned on and each recess 36 of the head 34 which is being intermittently rotated in timed relation with the scallop feeding belt 66, is supplied with a scallop S by the cam-actuated pivoting tray 70. It is to be noted that in passing over the heater bar 76, the meat or muscle of each scallop is heated for about 6 seconds and caused to relax its grip on the lower shell half.

The Geneva mechanism is now disengaged, direct high speed drive is engaged (by clutch means not shown), and the vacuum head 34 with the scallops held in the seating recesses 36 by the vacuum, is moved into the hood 24 by the lever 50 and rotated at speed from 1200 to 2000 r.p.m. depending on circumstances, and usually about 1500 for a few seconds. The spinning of the head effects the removal of the heated lower shell half and of the "gunk" of liquid and other materials within the shell (which hereinafter are designated as inedibles whether literally true or not) into the hood and the receptacle 30 by centrifugal force, leaving only the meat or muscle which is still attached to the unheated shell half held by the vacuum cups 38 in the recesses 36.

The lever 50 is now moved in the opposite direction to move the vacuum head 34 out of the hood 24 and into the hood 22. Simultaneously therewith, the heaters 58 behind the recesses 36 are energized so as to loosen the hold of the scallop muscle on the remaining shell half about the time that the vacuum head moves into the hood 22. The scallops S are now separated from the shell by the centrifugal force and fall into the receptacle 30' of the hood 22.

The lever 50 is now actuated to move the vacuum head 34 back within the hood 24 where the heaters 58 are de-energized and the vacuum cut off to release and permit the remaining shell halves to fall into the receptacle 30 with the other shells and inedibles. The vacuum head is finally moved back to the position of FIGURE 1 ready for another cycle of scallop feeding and separation from their shells.

In the forms of the invention disclosed in FIGURES 5 to 13, a scallop-holding vacuum head 134 having suction cups 138 mounted in scallop-receiving recesses 136 is mounted for rotation about a vertical axis on a hollow drive shaft 142 which is suitably journalled in a housing 110 having a frame 112 and supporting legs 126. A source of vacuum (not shown) is connected to the drive shaft 142 by means of a flexible conduit 156. Power is furnished from a motor M to a sprocket 147 fixed to the drive shaft 142 by a chain 148.

It will be apparent from the disclosure of FIGURES 1 to 4, that the hoods 22 and 24 and the vacuum head 34 were moved relatively to each other and that it is immaterial as to which moves as long as the relative movement ensures that all of the shells and gunk (inedibles) during centrifugal separation are discharged into one receptacle 30 and all of the meat or muscles are discharged into the other receptacle.

Accordingly, as disclosed in FIGURES 5 and 6, the hoods 122 and 124 are mounted on and fixed to the frame 112 while the rotatable vacuum head 134 is movable linearly in a vertical direction. The hood 122 includes a central scallop shell loading opening 127 and a lower and larger (to permit manual loading) central opening 128 to permit relative linear movement between the vacuum head and the two hoods whose bottom surfaces 100, 101 incline respectively to discharge chutes 102, 103 which empty into collection receptacles 130 or onto conveyors (not shown). The vacuum head 134 is mounted on a hollow shaft 143 which is splined to and movable upwardly along the shaft 142 to align the vacuum head with either of the scallop-shell and meat catching hoods, by a foot lever 108.

The upper peripheral surface of the frame 112 is provided with a plurality of heaters of any desired type, shown here as small oil burners, etc. 176 which are in radial alignment with the recesses 136 in the rotatable vacuum head 134 during loading. Above each burner, a scallop feeding tray 170 is pivoted as at 169. The inner ends of the trays are pivotally connected by rods 173 to a collar 175 which is slidable downwardly along the drive shaft 142 by means of an operating handle 177 to pivot each scallop tray 170 upwardly and toward a recess 136 to transfer the supported and just previously heated scallop S to the rotatable vacuum head where it is held against the suction cup 138 by the vacuum. An electric heater 158 is positioned on the inner face of each recess 136. This action is well shown in FIGURE 9 although other details are modified as will be described.

The operation of the apparatus having the vacuum head 134 rotating about a vertical axis is believed to be apparent. The rotation of the drive shaft 142 is effected by the motor M and controlled by a conventional combination clutch-brake (not shown) under the action of a foot lever 117 which is held down for high speed rotation for the few seconds required to effect the desired scallop shell separations, is intermittently depressed for scallop loading if desired, and is released to stop rotation of the shaft.

The scallops S are loaded onto the pivoted feeding trays through the hood apertures 127, 128 by advancing each one to a position in front of the operator. The scallops are placed on the trays with their hinge against the tray lip 171 and when each tray is loaded and has been heated for about 6 seconds, the lever 177 flips the scallops against the suction cups 138 of the vacuum head 134. With the vacuum head in the position of FIGURE 6, the foot lever 117 is depressed to rotate the head at high speed for a few seconds. Centrifugal forces throw the heated shells and inedibles against the outer sloping walls of the hood 124 from where they pass down the chute 103 to a receptacle 130.

The vacuum head 134 is now raised so that the hood 122 and the vacuum head are aligned, the recess heaters 158 are energized (only about 2 seconds is required due to residual heat) to loosen the scallop muscle on the remaining shell half, and the head is again rotated at high speeds. The centrifugally separated meats are thrown against the sloping sides of the hood 122 and pass down the chute 102 to a receptacle 130. The vacuum head is now lowered to align the head with the hood 124 and again rotated, the vacuum is cut off, and the released remaining shell halves pass by the chute 103 to join the inedibles and other shells in a receptable.

The exploded diagrammatic view of FIGURE 7 merely illustrates that the hoods 122 and 124 may be otherwise shaped and vertically spaced as shown by numerals 122' and 124' to permit the use of intermediately positioned, different forms of scallop feeding means, or of different discharge means as is schematically shown in FIGURE 11. In this latter form, a plurality of radially positioned discharge chutes 200 are mounted on vibrating means shown schematically as 202 which surround the drive shaft 142 and are supported by the frame 112.

The outer ends of the chutes 200 which are formed of two pairs of spaced rails, are curved upwardly and terminate beneath the scallop holding suction cups 138 so as to receive the scallop meat and its one remaining shell half when the vacuum in the rotating vacuum head is cut off. It is to be noted that the curved portion of the chutes act as orienting means so that the scallops slide under an electric heating means 204 with their shells up, the heating means behind the suction cups 138 in the rotating head 134 being dispensed with.

The heating means 204 are pivoted as at 206 and include springs 208 to bias them against adjusting rods 210. The operation of the apparatus using the chutes 200 differs in that as soon as the firs shell halves and inedibles are spun off, the vacuum head 134 is stopped with its suction cups above the ends of the chutes 200 and between the pivoted loading trays 170 (not shown in FIGURE 11). The vacuum is cut off to permit the scallops to fall down the chutes 200, become oriented and engage the heating means 204. The vibration of the lower end of the chutes then shakes the loosened edible muscles off the shell and they drop between the spaced rails 200 as at 212 downwardly into a collection receptacle etc. (not shown). The shells then fall off the inner chute ends into a receptacle.

FIGURE 12 discloses another form of discharge means which may be used instead of the vibrating heater-chute combination of FIGURE 11. In this form the radially disposed chute 220 (or chutes inasmuch as one for each suction cup 138 may be employed) curves downwardly and outwardly from just below a suction cup. As the vacuum in the head 134 is cut off, the shell and meat slides by gravity down the spaced rails of the chute to an operator equipped with a hollow tube 222 connected at its upper end 224 with a source of vacuum (not shown). The lower front edge 226 is sharpened or provided a good cutting edge so that the operator may cut the edible muscle 228 from the remaining shell half as they arrive in front of him. The muscles 228 are sucked up the tube 222 to a place of discharge (not shown) and the scallop shells fall off the end of the chute to a separate collection point (not shown).

FIGURES 8 and 9 disclose a modification of the above described details and show a spring loaded electric heating means 176' positioned under a feed tray 170 in the scallop loading position instead of the oil burner 176, and utilizes a solenoid 131 mounted on the frame 112 to effect pivoting of each tray upwardly to transfer the scallop to the suction cup 138.

FIGURE 10 diagrammatically illustrates a further modification of scallop feeding means for the rotary vacuum head 134 wherein the suction cup 138 is mounted in a recess of an individual suction head 131 pivoted to an arm 133 projecting from the main rotatable vacuum head 134', the vacuum connection being by a flexible conduit 135. Scallops are loaded onto combination supporting trays and electric heaters 176'' manually or by chutes upon which elevating rod 173' the heaters are fixed, are moved upwardly by the lever 177 to the position shown from a loading position just below. The scallop is retained by the vacuum head 131 and the balance of the separating procedure is as before (the head also having an electrical heater 158').

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:

1. An apparatus for removing scallops from their shells comprising, in combination, a rotatable head having a plurality of scallop seating apertured, peripheral recesses, vacuum means connected with said head and intermittently operable to retain scallops in said recesses and to release them, means adjacent said head for heating one shell of a scallop to release it from the scallop muscle and for moving the other shell thereof into one of said recesses, means for rotating said head to remove the heated shell and inedibles of the scallop by centrifugal force, and means for removing the scallops from the unheated shell.

2. The combination recited in claim 1 wherein said removing means comprises a vibrating chute including a heater to release the scallop from the other side of the scallop.

3. The combination recited in claim 2 wherein said heater is positioned on the upper side of said chute, and said chute orients the scallop and its attached shell so that the latter is uppermost and engages said heater during gravity actuated movement down said chute.

4. The combination recited in claim 1, and separate means for receiving said removed scallops and said removed shells.

5. An apparatus for removing scallops from their shells comprising, in combination, a rotatable head having a plurality of scallop seating apertured, peripheral recesses, vacuum means connected with said head and intermittently operable to retain scallops in said recesses and to release them, means adjacent said head for delivering scallops to the recesses thereof, heating means associated with said delivering means for heating the outer shells thereof to loosen them from the scallops, means for rotating said head to remove the heated shell and inedibles of the scallop by centrifugal force, and means for removing the scallops from the unheated shell.

6. The combination recited in claim 1 wherein said unheated shell of a scallop is heated by said head after said heated shell half has been discharged.

7. The combination recited in claim 4, and means positioned intermediate said separate discharge means for feeding scallops to said head.

8. The combination recited in claim 7, wherein the unheated shell of a scallop is heated by said head after said heated shell half has been discharged.

9. The combination recited in claim 7 wherein said feeding means comprises a conveyor.

10. An apparatus for separating the meat of scallops from their shells comprising, in combination, means for heating one shell to loosen it from the meat; rotatable means for supporting the other shell; separate discharge means for said shells and the meat; and means for effecting relative linear movement between said support and said separate discharge means and for rotating the former to sequentially and centrifugally discharge said heated shell into its discharge means, and the meat, and said other shell into their respective discharge means.

11. The combination recited in claim 10, and means for heating said unheated shell to loosen the meat and vibrating it to separate the meat therefrom.

12. The combination recited in claim 1 wherein said removing means comprises additional heating means to release said other shell from said scallop muscle and separate them by centrifugal force.

13. The combination recited in claim 5 wherein said delivering means comprises a pivotable feeding tray.

14. The combination recited in claim 5 wherein said delivering means comprises a conveyor and a pivotable feeding tray for receiving scallops from said conveyor.

15. The combination recited in claim 1 wherein said removing means comprises cutting means.

16. The combination recited in claim 5 wherein said removing means comprises cutting means.

References Cited by the Examiner

UNITED STATES PATENTS

| | | | |
|---|---|---|---|
| 2,942,292 | 6/1960 | Rey | 17—45 |
| 3,070,834 | 1/1963 | Carpenter | 17—45 |
| 3,203,034 | 8/1965 | Matzer et al. | 17—2 |
| 3,230,578 | 1/1966 | Marvin et al. | 17—9 |

FOREIGN PATENTS 90,725  1/1958  Norway.

LUCIE H. LAUDENSLAGER, *Primary Examiner.*